United States Patent
Uehara

(10) Patent No.: US 6,615,967 B2
(45) Date of Patent: Sep. 9, 2003

(54) CLUTCH DISK ASSEMBLY AND CLUTCH DEVICE

(75) Inventor: Hiroshi Uehara, Hirakata (JP)

(73) Assignee: Exedy Corporation, Osaka (JP)

(*) Notice: Subject to any disclaimer, the term of this patent is extended or adjusted under 35 U.S.C. 154(b) by 0 days.

(21) Appl. No.: 10/151,114

(22) Filed: May 21, 2002

(65) Prior Publication Data

US 2002/0179395 A1 Dec. 5, 2002

(30) Foreign Application Priority Data

May 29, 2001 (JP) ........................................ 2001-160555

(51) Int. Cl.[7] .............................................. F16D 13/64
(52) U.S. Cl. .............................. 192/70.17; 192/70.27; 192/212
(58) Field of Search ......................... 192/70.17, 70.27, 192/89.23, 107 R, 212

(56) References Cited

U.S. PATENT DOCUMENTS

| | | | | |
|---|---|---|---|---|
| 3,684,070 A | * | 8/1972 | Maucher | 192/213.31 |
| 3,863,747 A | * | 2/1975 | Werner et al. | 192/213.31 |
| 4,223,776 A | * | 9/1980 | Berlioux | 192/214.1 |
| 4,545,473 A | * | 10/1985 | Alas | 192/213.31 |
| 5,257,687 A | * | 11/1993 | Cooke | 192/213 |
| 5,788,041 A | * | 8/1998 | Viola et al. | 192/205 |
| 5,857,914 A | * | 1/1999 | Matsuoka | 464/64 |
| 6,244,962 B1 | * | 6/2001 | Bacher et al. | 464/68 |

* cited by examiner

*Primary Examiner*—Richard M. Lorence
(74) *Attorney, Agent, or Firm*—Shinjyu Global IP Counselors, LLP

(57) ABSTRACT

An object of the invention is to suppress an increase in an inner diameter of a friction facing of a clutch disk assembly, which may be caused by fixing portions of a plate member pair of a clutch disk assembly 1. The clutch disk assembly 1 is provided to couple to a flywheel 2 of an engine. The clutch disk assembly 1 includes a friction facing 20, a pair of plates 15 and 16, a hub 8, and coil springs 11. The plates 15 and 16 have fixing portions 34 fixing their outer peripheral portions together. The coil springs elastically couple the paired plates 15 and 16 to the hub 8 in the rotating direction. The fixing portions 34 project radially outward beyond the inner periphery of the friction facing 20.

20 Claims, 4 Drawing Sheets

CLUTCH DISK ASSEMBLY AND CLUTCH DEVICE

BACKGROUND OF THE INVENTION

1. Field of the Invention

The invention relates to a clutch disk assembly and a clutch device. More specifically, the present invention relates to a clutch disk assembly in which a clutch disk is fixed to outer peripheral portions of a pair of plate members that are fixed together, as well as a clutch device.

2. Background Information

A conventional clutch disk assembly used in a clutch of a vehicle generally has a clutch function and a damper function. The clutch function provides that the assembly engages and disengages a flywheel. The damper function provides that vibrations supplied from the flywheel are absorbed or damped.

A conventional clutch disk assembly includes a pair of input plates, an output hub, and coil springs. The pair of input plates axially oppose each other. The output hub is integrally provided with a radial flange. The coil springs elastically couple the input plates to the output hub in a circumferential direction. The coil springs are provided to realize the damper function and absorb vibrations from the flywheel. The paired input plates have radially outer portions that are fixed together. Thus, the paired input plates are arranged to rotate together. A plurality of stud pins are arranged in circumferentially spaced positions to fix the radially outer portions together. Opposite ends of each stud pin are fixed to the input plates by swaging or crimping, respectively. A clutch disk is fixed to a radially outer portion of one of the paired input plates by a plurality of rivets. The clutch disk is configured to be pressed against a friction surface of the flywheel by a pressure plate of the clutch cover assembly. The clutch disk is formed of, e.g., two friction facings and a cushioning plate arranged therebetween. The friction facing has an annular plate-like form, and is arranged radially outside fixing portions (e.g., stud pins) of the paired input plates described above. Therefore, if the position of the fixing portion of the input plate pair is shifted radially outward from the conventional position for the sake of design, the inner diameter of the clutch disk, and as a consequence, the inner diameter of the friction facing are increased.

In view of the above, there exists a need for a clutch disk assembly and clutch device that overcomes the above mentioned problems in the prior art. This invention addresses this need in the prior art as well as other needs, which will become apparent to those skilled in the art from this disclosure.

SUMMARY OF THE INVENTION

An object of the invention is to suppress an increase in an inner diameter of a friction facing, which may be caused by fixing portions of paired plates of a clutch disk assembly.

According to a first aspect of the invention, a clutch disk assembly that is arranged to be coupled to a flywheel of an engine, includes a friction facing, a pair of plate members, a hub, and an elastic member. The friction is facing arranged near the flywheel. The plate members are axially spaced from each other and have fixing portions for fixing radially outer portions of the plate members together. The elastic member elastically couples the paired plate members to the hub in a rotating direction. The fixing portion extends radially outside of an inner periphery of the friction facing. According to this clutch disk assembly, the fixing portion has a portion located radially outside the inner periphery of the friction facing so that the fixing portion does not increase the inner diameter of the friction facing.

A clutch disk assembly according to a second aspect of the present invention is the assembly of the first aspect further having a feature such that the fixing portions are formed in a plurality of circumferentially spaced positions on outer peripheries of the paired plate members.

A clutch disk assembly according to a third aspect of the present invention is the assembly of the first or second aspect further having a feature such that one of the paired plate members near the flywheel has a main body and a coupling portion. The coupling portion preferably extends from the outer periphery of the main body toward the other plate member and is coupled to the other plate member. The coupling portion has an axial extension and the fixing portion that extends radially outward from the axial extension. In this clutch disk assembly, the fixing portion of the coupling portion extends radially outward from the axial extension so that the required manufacturing steps can be fewer than those of a conventional structure having a radially outward fixing portion.

According to a fourth aspect of the present invention, a clutch device includes the clutch disk assembly of one of the first to third aspects, and a clutch cover assembly having a pressure plate for pressing the friction facing against the flywheel. The fixing portion extends further radially outside of the inner periphery of a pressing surface of the pressure plate.

According to a fifth aspect of the present invention, a clutch device or clutch disk assembly of any one of the first to fourth aspects further has a feature such that the pressure plate has a first inner peripheral surface and a second inner peripheral surface. The first inner peripheral surface is located on the friction facing side. The second inner peripheral surface is located on a side remote from the friction facing and has a diameter larger than that of the first inner peripheral surface. The radially outer end of the fixing portion is located radially outside the first inner peripheral surface, and is close to the second inner peripheral surface.

According to a sixth aspect of the present invention, a clutch device having a clutch disk assembly of any one of the first to fourth aspects, further has a feature such that the pressure plate has an annular main body and an annular portion extending radially inward from a portion on the friction facing side of the inner peripheral portion of the annular main body. The fixing portion is located on a side of the annular portion remote from the friction facing.

According to a seventh aspect of the present invention, a clutch device or clutch disk assembly of the sixth aspect further has a feature such that the annular portion is provided with a recess allowing axial movement of the fixing portion through the recess. According to this clutch device or clutch disk assembly, the fixing portion moves through the recess of the annular portion of the pressure plate when attaching the clutch cover assembly to the flywheel. This facilitates an attaching operation of the clutch cover assembly.

These and other objects, features, aspects, and advantages of the present invention will become apparent to those skilled in the art from the following detailed description, which, when taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS (1) Structure

Figure 1:
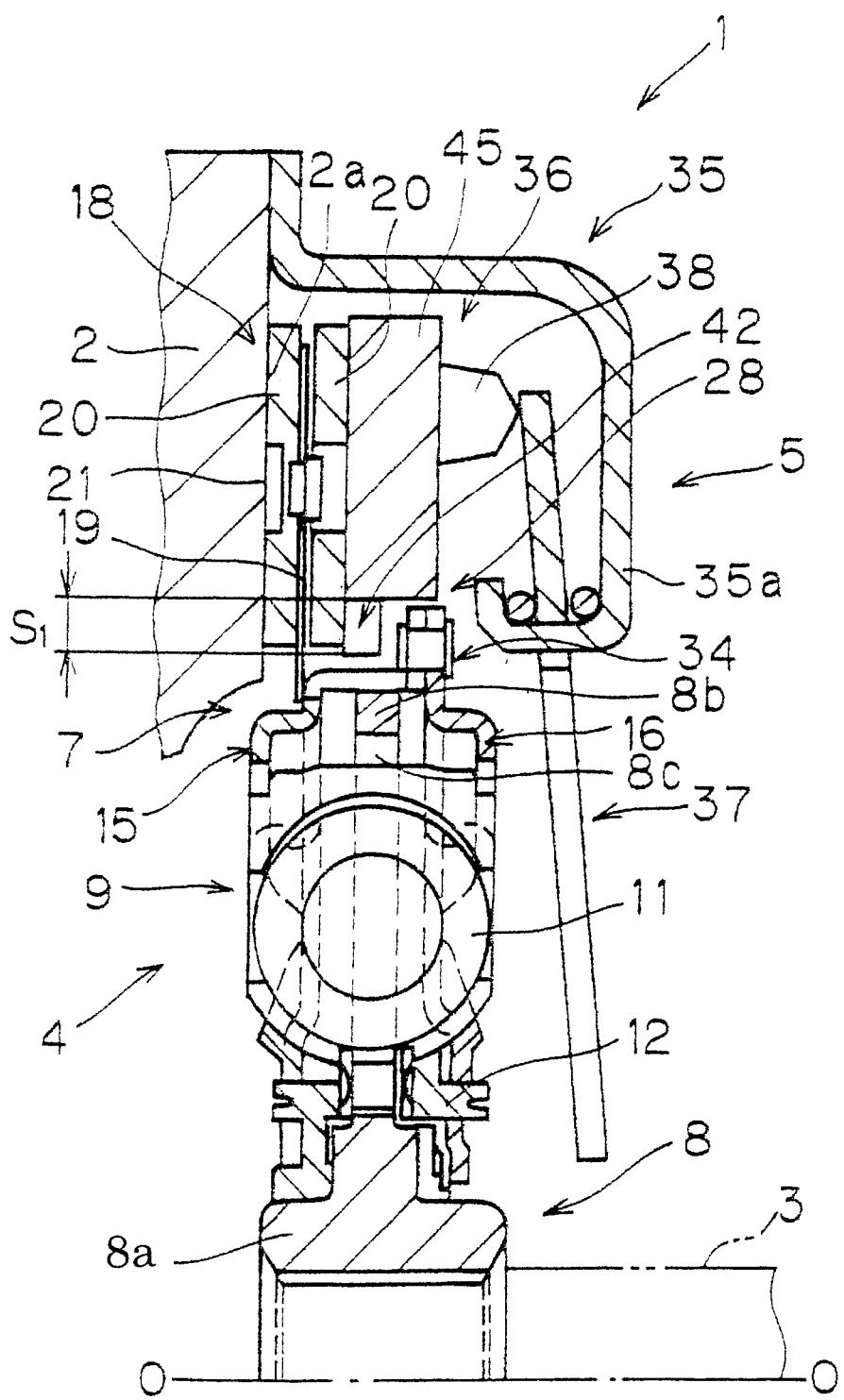
FIG. 1 is a cross-sectional view of a clutch device in accordance with a preferred embodiment of the present invention.
Figure 2:
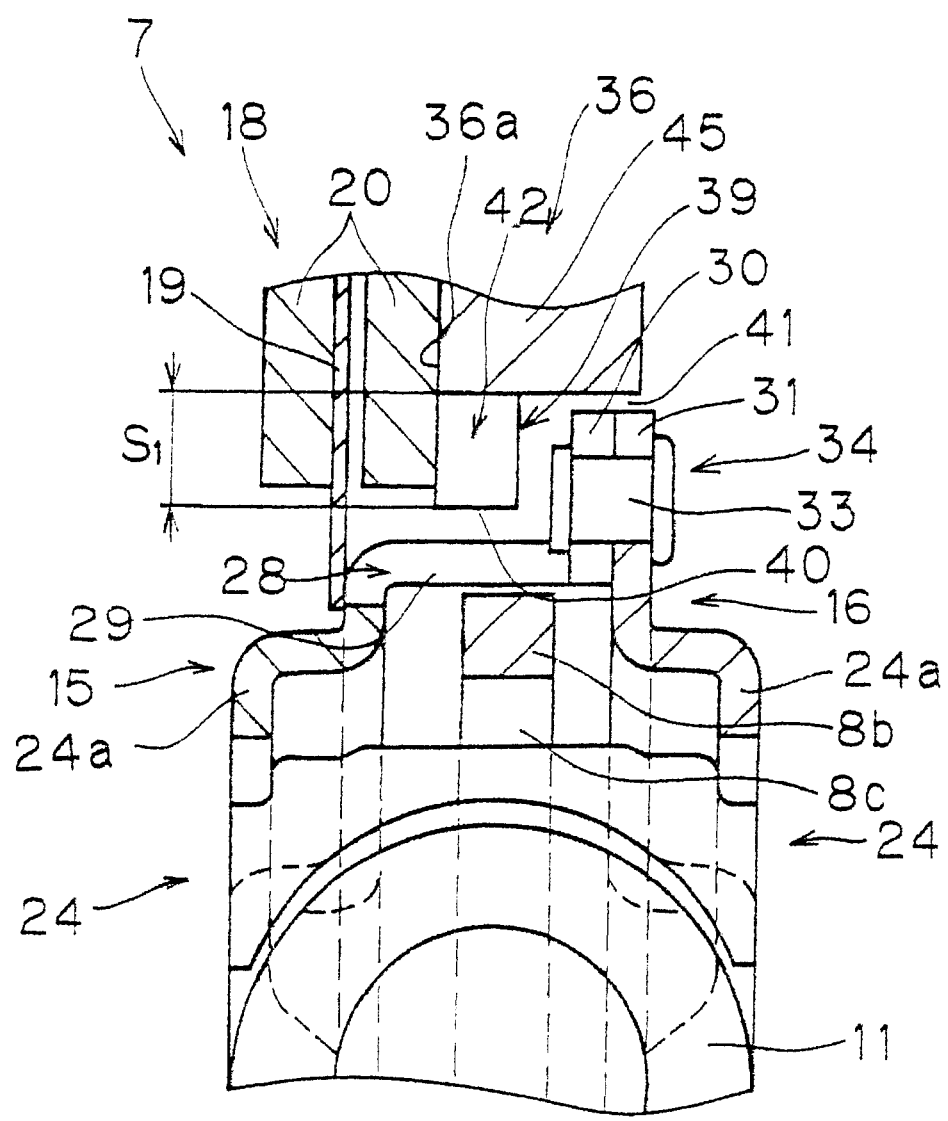
FIG. 2 is a fragmentary view showing, on an enlarged scale, a structure in FIG. 1.
Figure 3:
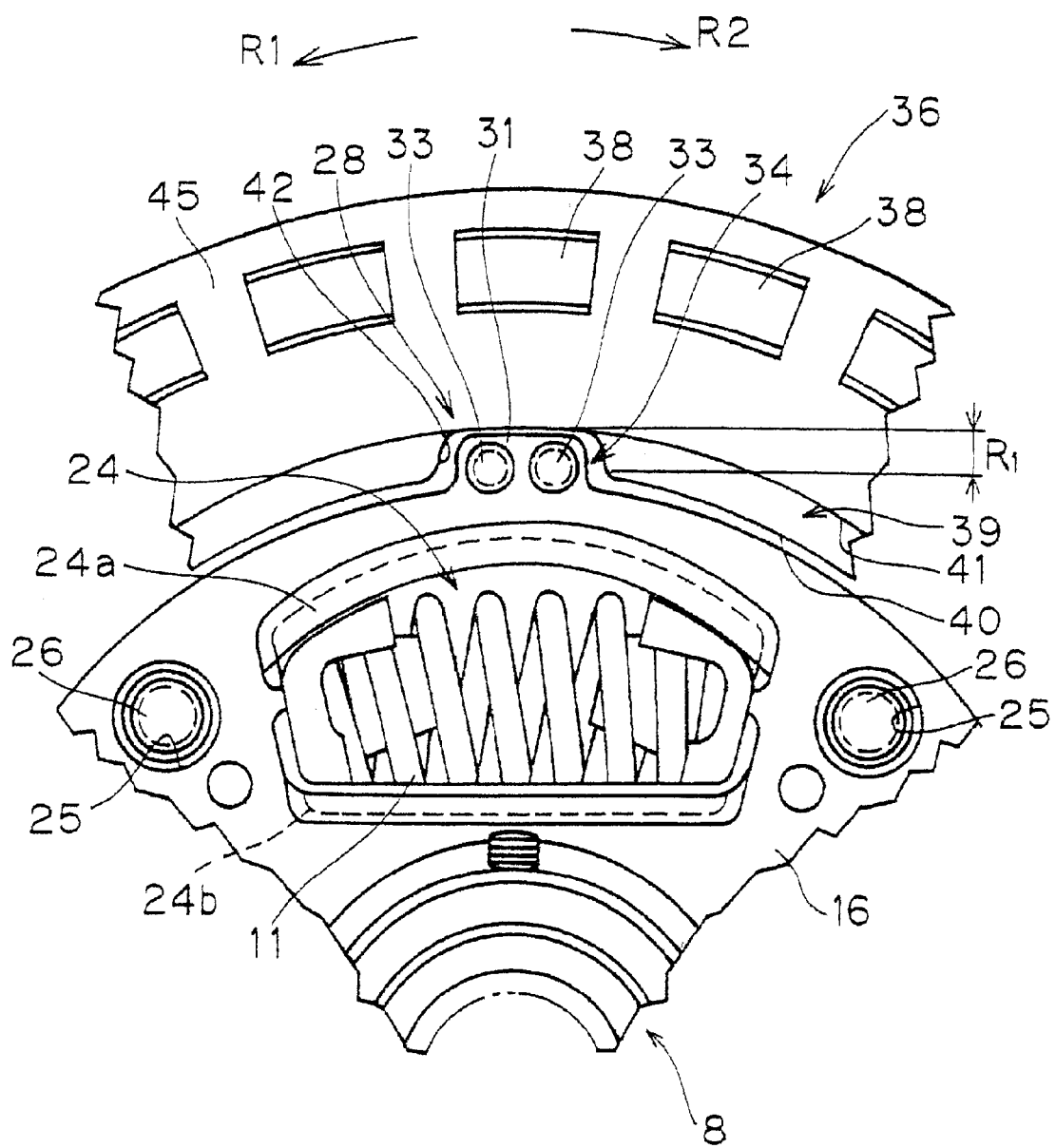
FIG. 3 is a fragmentary elevational view of the clutch device.

FIGS. 1–3 show a clutch device 1 for a vehicle in accordance with a preferred embodiment of the present invention. As seen in FIG. 1, the clutch device 1 is a device for selectively transmitting a torque from a flywheel 2 of an engine (not shown) to a main drive shaft 3 of a transmission (not shown). In FIG. 1, O—O indicates a mid-point of the main drive shaft 3 and thus, a rotation center line of the flywheel 2 and the clutch device 1. Although not shown, the engine is arranged on the left side in FIG. 1, and the transmission is arranged on the right side. In FIG. 3, R1 indicates a rotating direction or positive side direction of the flywheel 2 and the clutch device 1, and R2 indicates a reverse direction or negative side direction thereof.

Referring to FIG. 1, the flywheel 2 is preferably a disk-like member coupled to a crankshaft (not shown) of the engine. The flywheel 2 is provided on its radially outer portion with a friction surface 2a that is directed axially toward the transmission. The friction surface 2a has an annular and flat form, and is perpendicular to the axis O—O. The main drive shaft 3 extends axially from the transmission to a position near a center of the flywheel 2 on the engine side.

The clutch device 1 is basically formed of a clutch disk assembly 4 and a clutch cover assembly 5. The clutch disk assembly 4 has a clutch function and a damper function. The clutch function is configured so that engine torque is selectively transmitted by engagement with and disengagement from the flywheel 2. The damper function is configured so that springs or the like absorb or damp torque variations and the like applied from the flywheel side. The clutch cover assembly 5 is a device for disengageably coupling the clutch disk assembly 4 to the flywheel 2.

The clutch disk assembly 4 is basically formed of an input rotary member 7, a hub 8, and a damper mechanism 9. The input rotary member 7 has a clutch plate 15, a retaining plate 16, and a clutch disk 18. The hub 8 serves as an output rotary member. The damper mechanism 9 is arranged between the input rotary member 7 and the hub 8. The damper mechanism 9 includes coil springs 11 and a friction mechanism 12.

The input rotary member 7 is configured to receive torque from the flywheel 2. As mentioned, the input rotary member 7 is basically formed of the clutch plate 15, the retaining plate 16, and the clutch disk 18. The clutch and retaining plates 15 and 16 are formed of annular disk-like members preferably prepared by press working, respectively. The clutch and retaining plates 15 and 16 are axially spaced from each other by a predetermined distance. The clutch plate 15 is preferably arranged on the engine side, and the retaining plate 16 is preferably arranged on the transmission side. The clutch and retaining plates 15 and 16 are fixed together at fixing portions 34, which will be described later, so that the axial distance between them is fixed. Further, due at least in part to the fixing portions 34, the plates 15 and 16 are preferably configured to rotate together.

Figure 4:
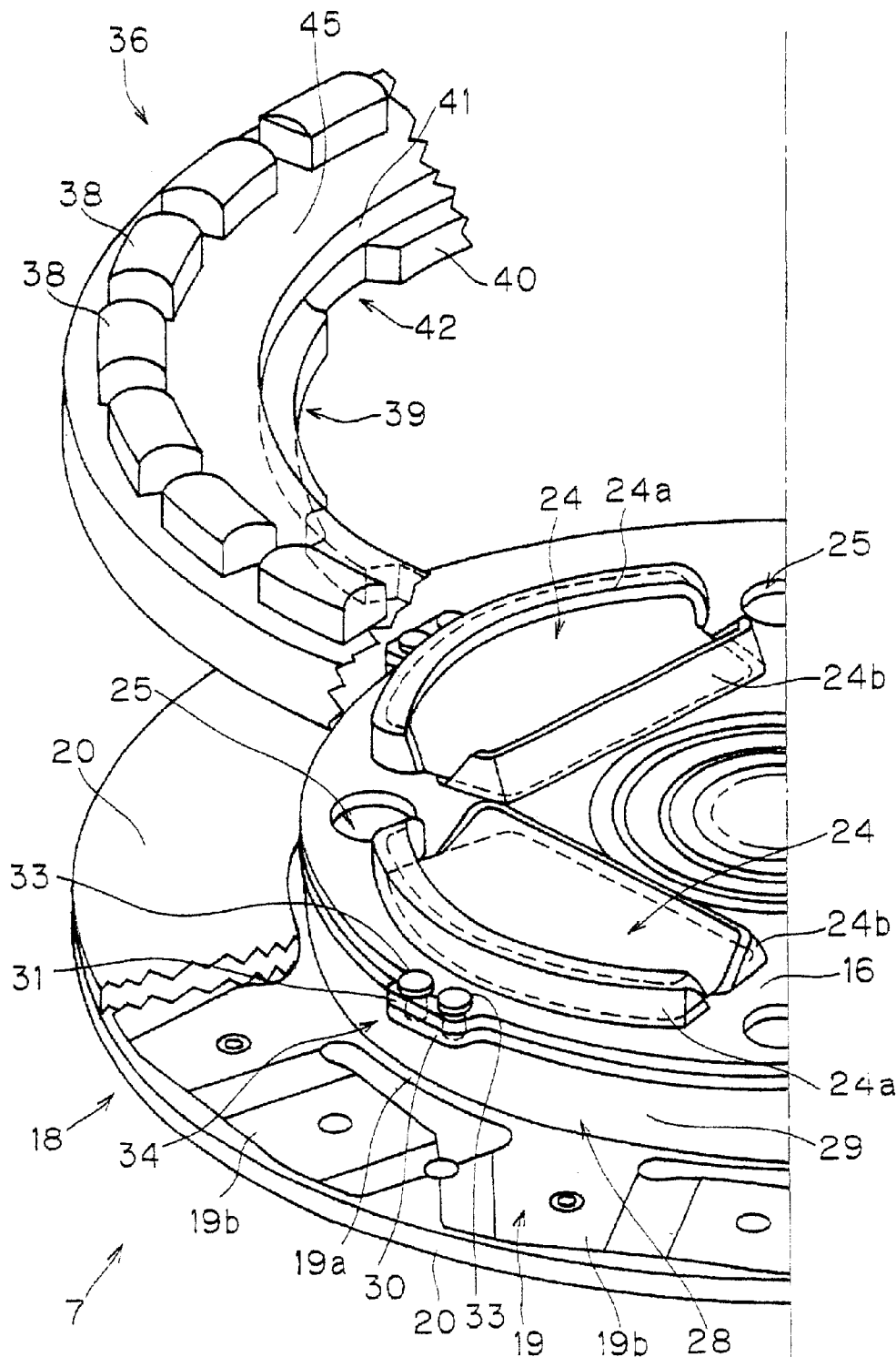
FIG. 4 is a fragmentary perspective view of the clutch device.

Referring to FIGS. 2 and 4, each of the plates 15 and 16 is provided with a plurality of circumferentially spaced windows 24. In this embodiment there are preferably four windows 24. The windows 24 are configured to accommodate and support the coil springs 11. Each window 24 has an axially penetrating aperture or opening, and is defined by a radially outer bent portion 24a and a radially inner bent portion 24b. The radially outer bent portion 24a is partially cut and bent axially outward from a main body of the plate 15 or 16. Similarly, the radially inner bent portion 24b is also partially cut and bent axially outward from the main body of the plate 15 or 16. As shown in FIGS. 3 and 4, the retaining plate 16 is provided with axially penetrating apertures 25 each located between two circumferentially neighboring windows 24. Each aperture 25 is provided for an operation of calking a rivet 26 that couples a cushioning plate 19 to the clutch plate 15.

Referring again to FIG. 1, the clutch disk 18 is a portion to be pressed against the friction surface 2a of the flywheel 2, and neighbors the friction surface 2a. The clutch disk 18 is basically formed of the cushioning plate 19 as well as first and second friction facings 20. As seen in FIG. 4, the cushioning plate 19 is formed of an annular portion 19a and a plurality of cushioning portions 19b. The cushioning portions 19b are arranged radially outside the annular portion 19a, and are circumferentially aligned to each other. Referring to FIGS. 3 and 4, the annular portion 19a is fixed to the clutch plate 15 by the rivets 26. As seen in FIGS. 1 and 4 friction facings 20 are fixed to opposite surfaces of each cushioning portion 19b of the cushioning plate 19 by the rivets 21, respectively. The friction facing 20 is an annular member having a predetermined radial width, and has a flat plate-like form.

The clutch and retaining plates 15 and 16 are fixed by a structure, which will now be described. As seen in FIG. 2, the clutch plate 15 is provided at its outer periphery with a coupling portion 28 extending axially from a main body of the plate 15. The coupling portion 28 has a plate-like structure, which is preferably integrally formed with the main portion of the clutch plate 15. The coupling portion 28 is formed of a cylindrical and axial extension 29 and a plurality of fixing portions 30 extending radially outward from the end of the extension 29. In this embodiment, these are preferably four fixing portions 30. The retaining plate 16 is provided at its outer periphery with fixing portions 31 located in positions corresponding to the fixing portions 30, respectively. Each fixing portion 31 is located radially outside the window 24, and particularly in a position radially outside a circumferential center of the window 24. The fixing portion 31 is integral with the outer periphery of the retaining plate 16, and projects radially outward therefrom. As seen in FIGS. 2 and 4, each fixing portion 30 is in axial contact with the corresponding fixing portion 31, and is preferably fixed thereto by two circumferentially spaced rivets 33. The fixing portions 30 and 31 as well as the rivets 33 described so far may be collectively referred to as "fixing portions 34" hereinafter. The fixing portion 34 extends radially outward beyond the inner periphery of the friction facing 20 of the clutch disk 18. Thus, at least a portion or a major portion of the fixing portion 34 is axially opposed to the radially inner portion of the friction facing 20.

Referring to FIG. 1, the hub 8 is basically formed of a boss 8a and a hub flange 8b. The boss 8a is engaged with the main drive shaft 3. The hub flange 8b is formed around the boss 8a and is located between the plates 15 and 16. In this embodiment, the boss 8a is preferably formed to be integral with the hub flange 8b. However, the boss 8a and the hub flange 8b may be formed independent of each other, and additionally may be coupled by a low-rigidity torsional damper. The hub flange 8b is provided with window apertures 8c corresponding to the windows 24, respectively. The coil spring 11 is arranged in the window aperture 8c.

Description will now be given on the structure of the clutch cover assembly 5. The clutch cover assembly 5 is basically formed of a clutch cover 35, a pressure plate 36, and a diaphragm spring 37. The clutch cover 35 is an annular member that is preferably prepared by press working. The clutch cover 35 is fixed to the flywheel 2. The clutch cover 35 has a support portion 35a, which is axially shifted from the friction surface 2a of the flywheel 2 toward the transmission. The pressure plate 36 is an annular member that axially neighbors the transmission side of the clutch disk 18. The pressure plate 36 is preferably coupled to the clutch cover 35 via strap plates (not shown) so that it is arranged to rotate together with the flywheel 2 and the clutch cover 35. The pressure plate 36 is axially movable with respect to the flywheel 2 and the clutch cover 35. The diaphragm spring 37 is preferably an annular plate spring, and is supported by the support portion 35a of the clutch cover 35 for axially and elastically biasing the pressure plate 36. When a release mechanism (not shown) acts on the radially inner portion of the diaphragm spring 37, the diaphragm spring 37 releases its biasing force toward the pressure plate 36.

The structure of the pressure plate 36 will now be described in greater detail. The pressure plate 36 is an annular member having a relatively large axial size and is preferably formed, e.g., by casting. As seen in FIGS. 1 and 2, the pressure plate 36 has a flat pressing surface 36a, which faces axially toward the engine side. The pressing surface 36a is axially opposed to the friction surface 2a. The clutch disk 18 and consequently, the friction facing 20 are located axially between the surfaces 36a and 2a. The pressing surface 36a has an inner diameter substantially equal to or slightly smaller than that of the friction facing 20. The pressing surface 36a is in contact with the entire surface of the friction facing 20 including its inner periphery. As seen best in FIG. 4, the pressure plate 36 has a plurality of circumferentially spaced projections 38 located on the surface of its main body on the transmission side. Referring again to FIG. 1, the projections 38 are in contact with the outer peripheral portion of the diaphragm spring 37.

As seen in FIG. 4, the pressure plate 36 is provided at its radially inner portion with an annular stepped portion 39. The annular stepped portion 39 projects radially inward from a portion of the main body 45 near the friction facing 20. The annular stepped portion 39 is arranged to be axially offset from the fixing portions 34. In other words, a concavity is formed between a portion of the stepped portion 39 axially neighboring the transmission and an inner peripheral portion of the main body 45 remote from the friction facing 20. The inner peripheral surface of the pressure plate 36 includes a first inner peripheral surface 40 and a second inner peripheral surface 41. The first inner peripheral surface 40 is formed of the inner peripheral surface of the stepped portion 39. The second inner peripheral surface 41 is formed of the inner peripheral surface of the main body 45. Naturally, as seen in FIG. 2, the first inner peripheral surface 40 has a smaller diameter than the second inner peripheral surface 41, and a difference between these diameters is indicated by S1. As a result of the above structures, the first inner peripheral surface 40 has a diameter that is preferably equal to innermost diameter of the flat pressing surface 36a of the pressure plate 36.

As seen in FIGS. 1 and 3, the fixing portions 34 of the plates 15 and 16 are arranged within the concavities on the inner periphery of the pressure plate 36, respectively. Thus, the fixing portions 34 project radially outward beyond the inner periphery of the pressing surface 36a. In other words, the fixing portions 34 project radially outward beyond the first inner peripheral surface 40, and therefore, project radially outward beyond the radially innermost edge of the pressure plate 36. As seen in FIG. 2, the radially outer edge of the fixing portion 34 is close to the second inner peripheral surface 41. Owing to the above structure, the pressure plate 36 is prevented from interfering in the rotating direction with the fixing portions 34. Further, the plates 15 and 16 are rotatable with respect to the pressure plate 36. Moreover, as seen in FIGS. 2 and 4, the stepped portion 39 is provided with a plurality of circumferentially spaced recesses 42. The circumferential positions and the circumferential widths of the recesses 42 correspond to those of the fixing portions 34, respectively. Thus, the fixing portions 34 can move through the recesses 42 when attaching the clutch cover assembly 5 to the flywheel 2. In other words, when attaching the clutch cover assembly 5 to the flywheel 2 in an axial direction, the fixing portions 34 are not impediments because of the recesses 42. It is preferable that the fixing portion 34 has the smallest circumferential width within a range allowing provision of an intended strength. In this embodiment, each fixing portion 34 has an angular size of about 13 degrees in the rotating direction. Further, this angular size is preferably in a range from 10 to 15 or 20 degrees.

(2) Operation

Referring to FIG. 1, when the clutch is engaged, the torque of flywheel 2 is transmitted to the main drive shaft 3 through the input rotary member 7, the damper mechanism 9, and the hub 8. In this operation, the input rotary member 7 of the clutch disk assembly 4 rotates together with the clutch cover assembly 5. When the clutch is disengaged, the clutch disk assembly 4 stops its rotation, and the flywheel 2 and the clutch cover assembly 5 rotate relatively to the clutch disk assembly 4. Thus, torque is not transferred to the main drive shaft 3. In this operation, due in part to the structure of annular stepped portion 39, the fixing portions 34 of the plates 15 and 16 do not interfere in the rotating direction with the pressure plate 36 although the fixing portions 34 have portions located radially outside the innermost peripheral surface of the pressure plate 36.

An assembling operation of the clutch device 1 will now be described. First, the clutch disk assembly 4 is located near the flywheel 2. Then, the clutch cover assembly 5 is preferably substantially axially moved toward the flywheel 2 from the right side in FIG. 1. In the clutch cover assembly 5 thus moved, the pressure plate 36 and the diaphragm spring 37 are already fixed to the clutch cover 35. When moving the pressure plate 36 in the assembling operation, the recesses 42 of the pressure plate 36 are opposed to the fixing portions 34 of the plates 15 and 16. Thereby, the stepped portion 39 of the pressure plate 36 can move axially without interference with the fixing portions 34. When fully moved, the clutch cover 35 is fixed to the flywheel 2 by bolts (not shown).

(3) Summary of Effects

According to the clutch device 1, the pressure plate 36 has the annular main body 45 and the annular stepped portion 39 extending radially inward from a portion of the body 45 on the friction facing side. The stepped portion 39 has the plurality of recesses 42.

The fixing portions 34 for fixing the paired plates 15 and 16 together are formed in a plurality of circumferentially spaced portions on the outer peripheries of the paired plates 15 and 16, and project radially outward beyond the inner periphery of the friction facing 20. The fixing portion 34 is located near the side of the stepped portion 39 remote from the friction facing.

The fixing portions 34 correspond in number, width, and others to the recesses 42 of the stepped portion 39, and can axially move through the recesses 42.

The above structures can achieve the following effects (1)–(3).

(1) In the clutch plate 15, the fixing portion 30 is bent axially outward from the axial extension 29 so that the number of manufacturing steps can be reduced.

(2) Each of the friction facing 20 and the pressing surface 36a of the pressure plate 36 has the inner periphery thereof located radially inside the radially outer edges of the fixing portions 34. Therefore, the fixing portions 34 do not increase the inner diameter of the friction facing 20 although the structure of the above item (1) is employed.

(3) The fixing portions 34 are formed in the circumferentially spaced positions on the outer peripheries of the plates 15 and 16, and the pressure plate 36 is provided at its stepped portion 39 with the recesses 42. Thereby, the clutch cover assembly 5 including the pressure plate 36 can be easily attached to the flywheel 2 although the structure of the above item (1) is employed.

Other Embodiments

In the foregoing embodiment, the axial extension of the coupling portion of the clutch plate has a cylindrical form. However, the axial extension may be formed of a plurality of circumferentially spaced portions arranged along the outer periphery of the clutch plate. In the latter case, the hub flange may be provided at its end with projections, which are located circumferentially between the axial extensions to form the stopper together with the axial extensions.

The clutch cover, diaphragm spring and others of the clutch cover assembly may have structures and configurations other than the above.

Effect of the Invention

According to the clutch disk assembly of the invention, since the fixing portions project radially outward beyond the inner periphery of the friction facing, the fixing portions do not increase the inner diameter of the friction facing.

The terms of degree such as "substantially," "about," and "approximately" as used herein mean a reasonable amount of deviation of the modified term such that the end result is not significantly changed. These terms should be construed as including a deviation of at least ±5% of the modified term if this deviation would not negate the meaning of the word it modifies.

This application claims priority to Japanese Patent Application No. 2001-160555. The entire disclosure of Japanese Patent Application No. 2001-160555 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A clutch disk assembly being configured to be coupled to a flywheel of an engine, said clutch disk assembly comprising:
   a friction facing being arranged near the flywheel;
   a pair of plate members being axially spaced from each other and having fixing portions to fix radially outer portions of said plate members together, said fixing portions being configured to extend radially outside of an inner periphery of said friction facing;
   a hub; and
   an elastic member being configured to couple elastically in a rotating direction said pair of plate members to said hub.

2. The clutch disk assembly according to claim 1, wherein said fixing portions are formed in a plurality of circumferentially spaced positions on outer peripheries of said pair of plate members.

3. The clutch disk assembly according to claim 2, wherein one of said pair of plate members near the flywheel comprises a main body and coupling portions extending from an outer periphery of said main body toward an other of said pair of plate members, said one of said pair of plate members is coupled to said other of said pair of plate members, and
   said coupling portions have an axial extension and said fixing portion, said fixing portion being arranged to extend radially outward from said axial extension.

4. The clutch disk assembly according to claim 1, wherein one of said pair of plate members near the flywheel comprises a main body and a coupling portion extending from an outer periphery of said main body toward an other of said pair of plate members, said one of said pair of plate members is coupled to said other of said pair of plate members, and
   said coupling portion has an axial extension and said fixing portion, said fixing portion being arranged to extend radially outward from said axial extension.

5. A clutch device comprising:
   a flywheel;
   a clutch disk assembly being configured to be coupled to said flywheel, said clutch disk assembly comprising,
      a friction facing being arranged near said flywheel,
      a pair of plate members being axially spaced from each other and having fixing portions to fix radially outer portions of said plate members together, said fixing portions being configured to extend radially outside of an inner periphery of said friction facing,
      a hub, and
      an elastic member being configured to couple elastically in a rotating direction said pair of plate members to said hub; and
   a clutch cover assembly having a pressure plate for pressing said friction facing against said flywheel, said fixing portion being configured to extend radially outside of an inner periphery of a pressing surface of said pressure plate.

6. The clutch device according to claim 5, wherein said fixing portions are formed in a plurality of circumferentially spaced positions on outer peripheries of said pair of plate members.

7. The clutch device according to claim 6, wherein one of said pair of plate members near the flywheel comprises a main body and coupling portions extending from an outer periphery of said main body toward an other of said pair of plate members, said one of said pair of plate members is coupled to said other of said pair of plate members, and said coupling portions have an axial extension and said fixing portion, said fixing portion being arranged to extend radially outward from said axial extension.

8. The clutch device according to claim 7, wherein said pressure plate comprises,
- a first inner peripheral surface facing said friction facing, and
- a second inner peripheral surface located on the side remote from the friction facing, said friction facing is arranged to have an inner peripheral diameter that is larger than an inner peripheral diameter of said first inner peripheral surface, and a radially outer end of said fixing portion is located radially outside said first inner peripheral surface, and is close to said second inner peripheral surface.

9. The clutch device according to claim 7, wherein said pressure plate comprises an annular main body and an annular portion extending radially inward from a portion on a side facing said friction facing, said annular portion is on an inner peripheral portion of said annular main body, and said fixing portion is located on said side of said annular portion remote from said friction facing.

10. The clutch device according to claim 9, wherein said annular portion is provided with a recess configured to allow axial movement of said fixing portion through said recess.

11. The clutch device according to claim 6, wherein said pressure plate comprises,
- a first inner peripheral surface facing said friction facing, and
- a second inner peripheral surface located on the side remote from the friction facing, said friction facing is arranged to have an inner peripheral diameter that is larger than an inner peripheral diameter of said first inner peripheral surface, and a radially outer end of said fixing portion is located radially outside said first inner peripheral surface, and is close to said second inner peripheral surface.

12. The clutch device according to claim 6, wherein said pressure plate comprises an annular main body and an annular portion extending radially inward from a portion on a side facing said friction facing, said annular portion is on an inner peripheral portion of said annular main body, and said fixing portion is located on said side of said annular portion remote from said friction facing.

13. The clutch device according to claim 12, wherein said annular portion is provided with a recess configured to allow axial movement of said fixing portion through said recess.

14. The clutch device according to claim 5, wherein one of said pair of plate members near the flywheel comprises a main body and a coupling portion extending from an outer periphery of said main body toward an other of said pair of plate members, said one of said pair of plate members is coupled to said other of said pair of plate members, and said coupling portion has an axial extension and said fixing portion, said fixing portion being arranged to extend radially outward from said axial extension.

15. The clutch device according to claim 14, wherein said pressure plate comprises,
- a first inner peripheral surface facing said friction facing, and
- a second inner peripheral surface located on the side remote from the friction facing, said friction facing is arranged to have an inner peripheral diameter that is larger than an inner peripheral diameter of said first inner peripheral surface, and a radially outer end of said fixing portion is located radially outside said first inner peripheral surface, and is close to said second inner peripheral surface.

16. The clutch device according to claim 14, wherein said pressure plate comprises an annular main body and an annular portion extending radially inward from a portion on a side facing said friction facing, said annular portion is on an inner peripheral portion of said annular main body, and said fixing portion is located on said side of said annular portion remote from said friction facing.

17. The clutch device according to claim 16, wherein said annular portion is provided with a recess configured to allow axial movement of said fixing portion through said recess.

18. The clutch device according to claim 14, wherein said pressure plate comprises,
- a first inner peripheral surface facing said friction facing, and
- a second inner peripheral surface located on the side remote from the friction facing, said friction facing is arranged to have an inner peripheral diameter that is substantially equal to an inner peripheral diameter of said first inner peripheral surface, and a radially outer end of said fixing portion is located radially outside said first inner peripheral surface, and is close to said second inner peripheral surface.

19. The clutch device according to claim 5, wherein said pressure plate comprises an annular main body and an annular portion extending radially inward from a portion on a side facing said friction facing, said annular portion is on an inner peripheral portion of said annular main body, and said fixing portion is located on said side of said annular portion remote from said friction facing.

20. The clutch device according to claim 19, wherein said annular portion is provided with a recess configured to allow axial movement of said fixing portion through said recess.

* * * * *